April 23, 1968

M. CLOSSET 3,378,918

METHOD OF MANUFACTURING A MULTIPOLAR MAGNETIC LENS

Original Filed July 15, 1964

INVENTOR
Maurice CLOSSET

ATTORNEY

United States Patent Office 3,378,918
Patented Apr. 23, 1968

3,378,918
METHOD OF MANUFACTURING A
MULTIPOLAR MAGNETIC LENS
Maurice Closset, Mont-sur-Marchienne, Belgium, assignor to Ateliers de Constructions Electriques de Charleroi (ACEC) Societe Anonyme, Brussels, Belgium
Original application July 15, 1964, Ser. No. 382,802. Divided and this application May 19, 1966, Ser. No. 551,259
Claims priority, application Belgium, July 15, 1963, 634,990
1 Claim. (Cl. 29—602)

ABSTRACT OF THE DISCLOSURE

A method of manufacturing a multipolar magnetic lens made up of an annular yoke and a plurality of polar pieces mounted along the bore of the yoke. Arcuate air-gap surfaces are first machined on the polar pieces. The latter are then assembled in spaced relationship around a central mandrel having a diameter equal to that of the air-gap at the center of the lens. The polar pieces are then machined, as assembled, to form an outer cylindrical contact surface corresponding to the bore of the yoke. The central mandrel is removed and the polar pieces mounted and secured in the bore of the yoke with the outer cylindrical contact surface in contact with the bore.

Figures 1, 2:
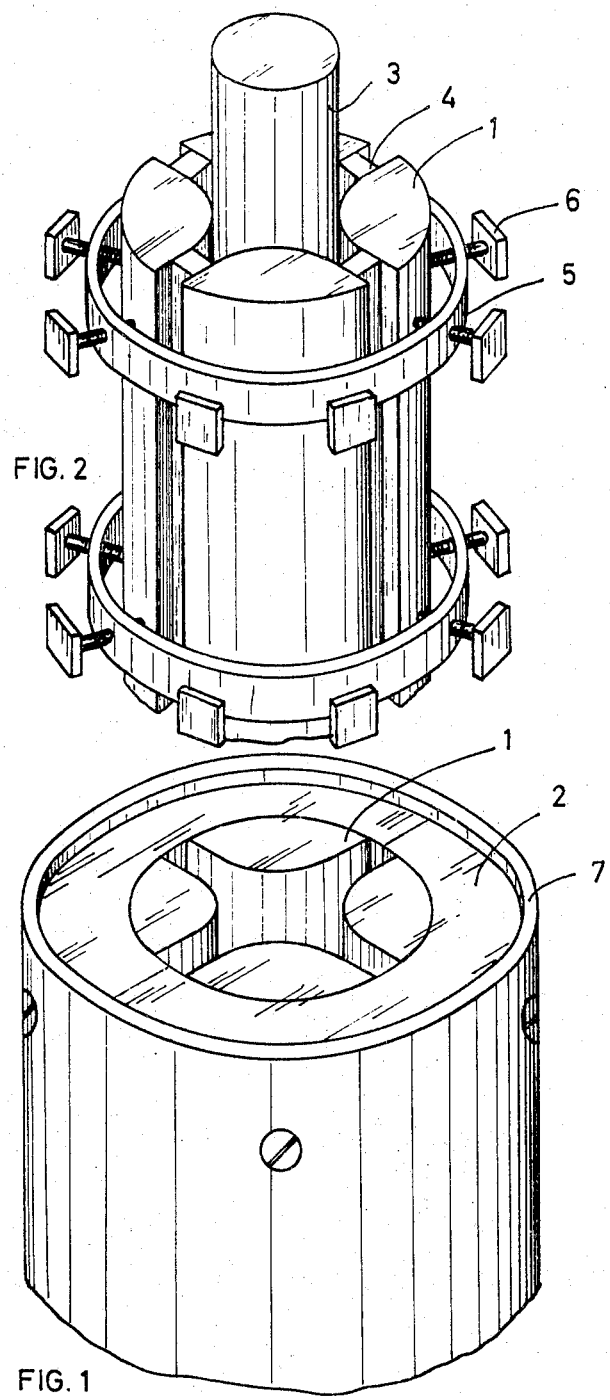

This application is a division of my prior application, Ser. No. 382,802, filed July 15, 1964 and now abandoned.

The instant invention relates a method of manufacturing a multipolar magnetic lens.

It is known to manufacture multipolar magnetic lens by an assembly of parts having planar faces machined with great precision. When such magnetic lens have to be manufactured for fields of high intensity and with extremely large airgaps, the known method becomes extremely expensive because each part is machined with high precision.

An object of the present invention is to provide a method of manufacturing a magnetic lens offering a better guarantee in the precision of the dimensions of the air-gap and so constructed that it is possible to obtain the same dimensions again after each dismantling.

The multipolar magnetic lens made according to the method of the invention is characterized in that the contact surfaces between the polar pieces and the yoke are parts of the same cylindrical surface and in that the yoke is formed by the assembly of two hollow half-cylinders. This method of assembling the magnetic lens has several advantages. When the polar pieces are correctly machined, their plane of symmetry always cuts the axis of the lens, even when there is minor errors in securing them on the yoke. The possible distortion of the field is consequently much less important than that wherein the polar pieces are secured on planar faces of the yoke and where the slightest shift from their theoretical location results in the planes of symmetry of the polar pieces no longer cutting the axis.

The magnetic lens according to the invention is also easier to manufacture because after the final machining of the profile of the polar pieces, on the air-gap side, they are assembled by means of several collars around a member having the critical dimensions of the air-gap. The surfaces of contact with the yoke are thereafter machined on a lathe and the polar pieces thus obtained are secured in a bore previously provided in the yoke.

The invention is hereinafter described in relation to a specific embodiment given as an example only and shown in the appended drawing wherein:

FIG. 1 is a perspective view of one end of the magnetic lens to be manufactured, and FIG. 2 is a perspective view of the ends of the polar pieces in assembled condition, ready for machining.

In FIG. 1, four polar pieces 1 are secured on an annular yoke 2 cut in two along a diameter thereof in order to allow mounting of the winding.

In FIG. 2, the polar pieces 1 are assembled as in a final mounting, but disposed against a central mandrel 3 the diameter of which is equal to the air-gap at the center of the lens. The dimensions of the spaces allowed for the winding are defined by means of spacers 4, one or several of which may be integral with mandrel 3 to prevent errors in alignment. The polar pieces are pressed against the central mandrel 3 by means of several collars 5 provided with pressure screws 6. The number of these collars is rather high whereby it is possible to move them one after the other to allow lathe-working on the full height thereof.

When the surfaces of the polar pieces which come in contact with the yoke are turned with the required precision, the yoke 3 and spacers 4 are removed and the polar pieces are secured on the cylindrical inner surface of the yoke by means of screws provided for that purpose.

The yoke may also include a cylindrical shoulder 7, serving for the accurate positioning of end plates (not shown). In the present example, the yoke has the shape of a hollow cylinder. This shape is particularly advantageous when several magnetic lens have to be aligned according to the same load carrier path and with different orientations of the axes of the polar pieces, because in such a case, it is only necessary to arrange them on a cradle with the proper orientation.

I claim:

1. In a method of manufacturing a multipolar magnetic lens constituted by a yoke having a bore and a plurality of polar pieces, the steps comprising:
   machining arcuate air-gap surfaces on said polar pieces;
   assembling said polar pieces in spaced relationship around a central mandrel having a diameter equal to the air-gap at the center of the lens;
   machining said assembled polar pieces to form an outer cylindrical contact surface corresponding to the bore of said yoke;
   removing said central mandrel, and
   mounting said machined polar pieces and securing them in the bore of said yoke with said outer cylindrical contact surface in contact with said bore.

References Cited

UNITED STATES PATENTS

| 2,653,376 | 9/1953 | Fletcher et al. | |
| 2,719,267 | 9/1955 | Kunz et al. | |
| 2,782,335 | 2/1957 | Ellis | 29—607 X |
| 2,919,381 | 12/1959 | Glaser | 315—31 |

CHARLIE T. MOON, *Primary Examiner.*

D. C. REILEY, *Assistant Examiner.*